United States Patent [19]
Holmes, Jr

[11] 4,346,962
[45] Aug. 31, 1982

[54] LIGHT ANALYZING LENTICULAR SCREEN FOR VIEWING STEREO IMAGES

[76] Inventor: Lawrence Holmes, Jr, 605 Hamburg Turnpike, Apt. 102, Pompton Lakes, N.J. 07442

[21] Appl. No.: 48,757

[22] Filed: Jun. 15, 1979

Related U.S. Application Data

[62] Division of Ser. No. 651,202, Jan. 21, 1976, Pat. No. 4,172,632.

[51] Int. Cl.$^3$ ............................................. G03B 21/60
[52] U.S. Cl. .................................... 350/128; 350/132; 355/22
[58] Field of Search ................ 352/61, 85, 86; 353/7, 353/10; 354/112; 355/22; 350/132, 128, 144

[56] References Cited
U.S. PATENT DOCUMENTS

2,317,875  4/1943  Athey et al. ........................... 355/22
3,597,042  8/1971  Favre ................................. 352/86 X

*Primary Examiner*—Richard A. Wintercorn
*Attorney, Agent, or Firm*—Phillips, Moore, Lempio & Majestic

[57] ABSTRACT

A screen construction enables three dimensional perception of projected stereo images without necessarily requiring that the viewer wear analyzing eyeglasses. Three dimensional shadow image data is generated by projecting light towards the screen, through the region of the object or objects to be imaged, from spaced apart light sources each of which produces light coded in a different manner. The screen construction has an array of linear, parallel bands of light analyzing material. A first group of the bands transmit light from only one of the sources and are alternated with ones of a second group of the bands which transmit only light from the other of the sources. A lenticular screen between the array of bands and the viewer restricts visibility of one group of bands to one eye of the viewer and restricts visibility of the other group of bands to the other eye of the viewer.

7 Claims, 15 Drawing Figures

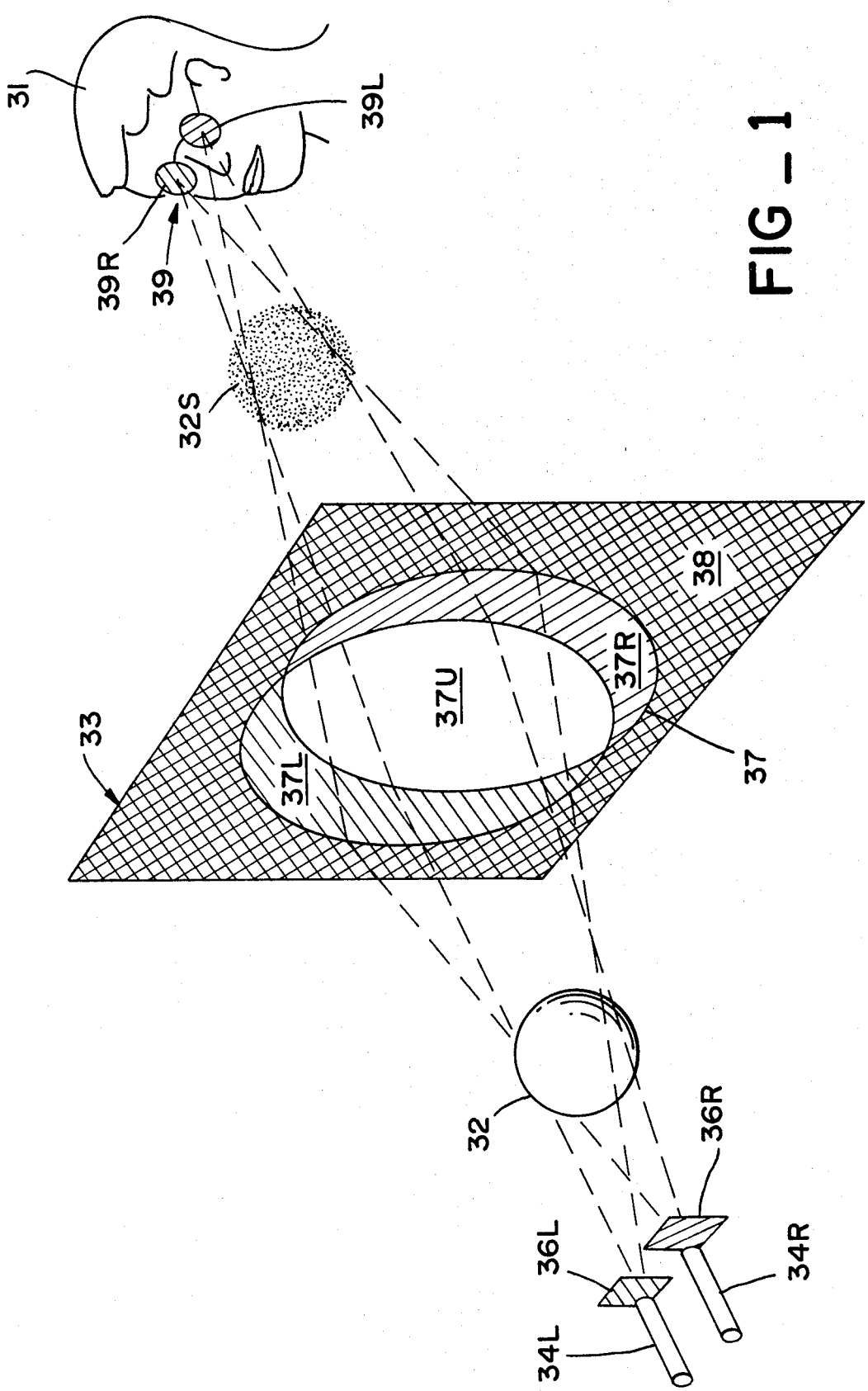

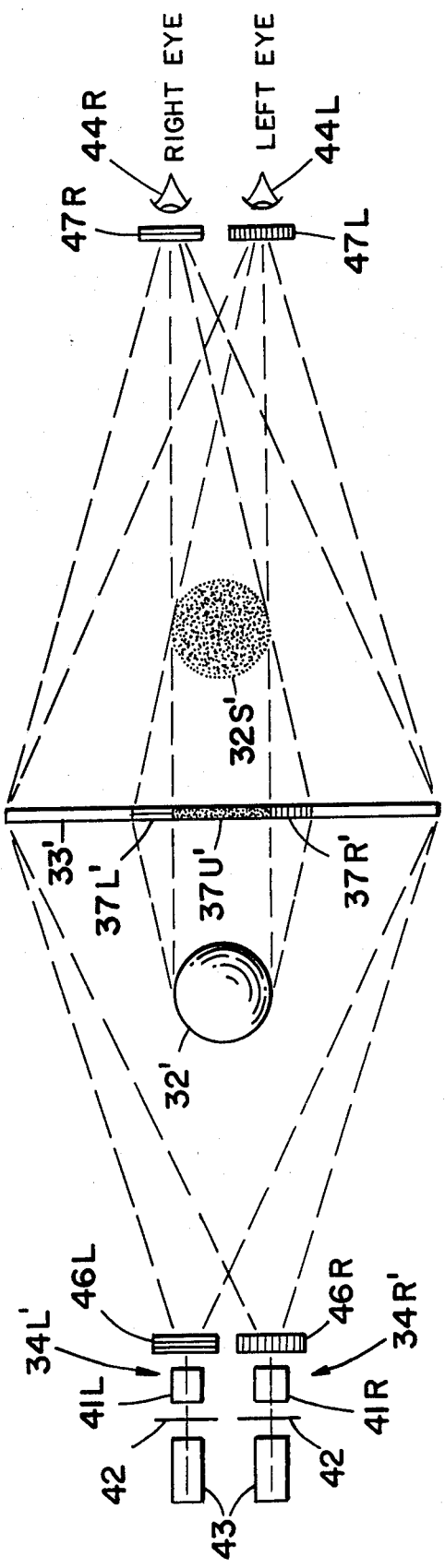
FIG_2
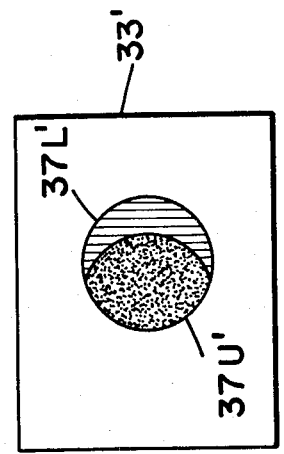
FIG_3C
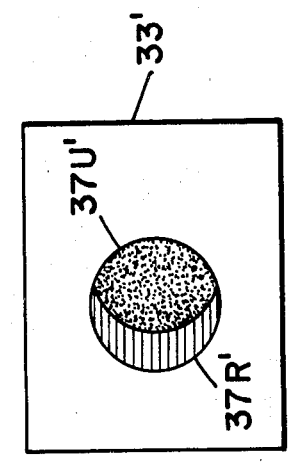
FIG_3B
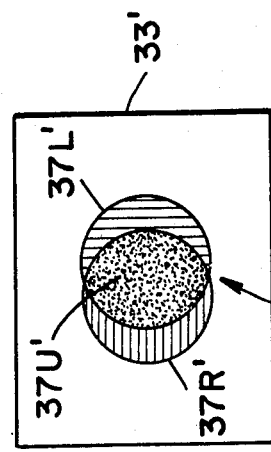
FIG_3A

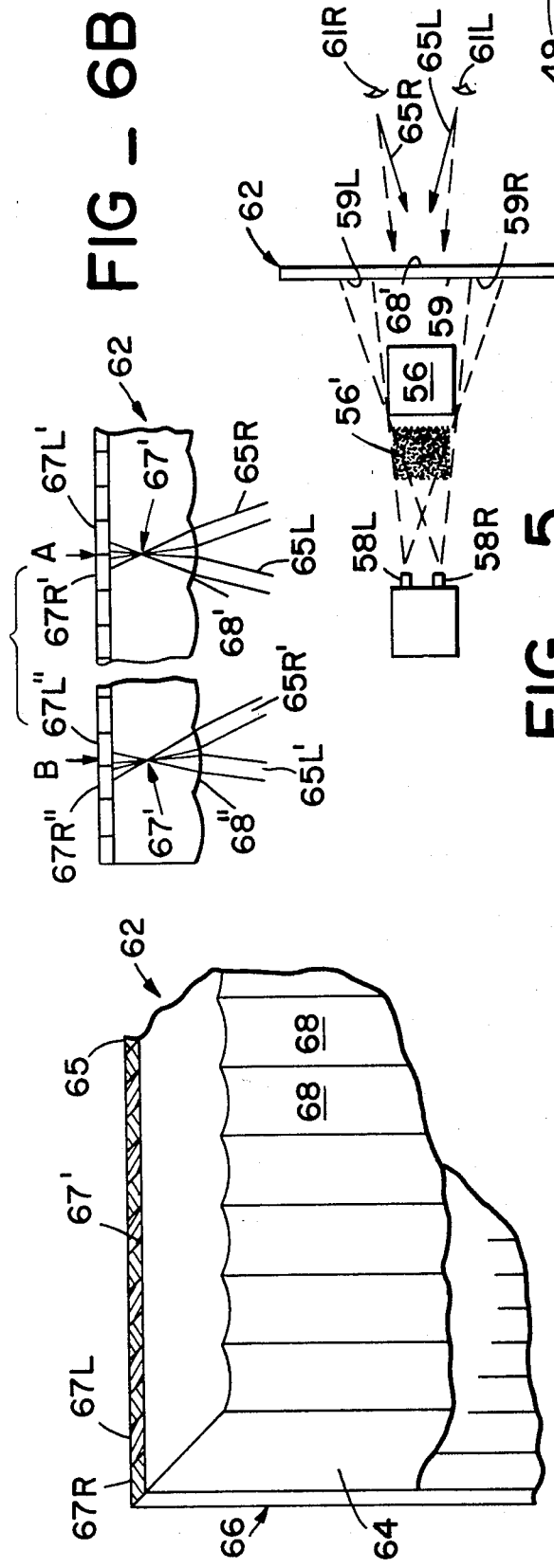

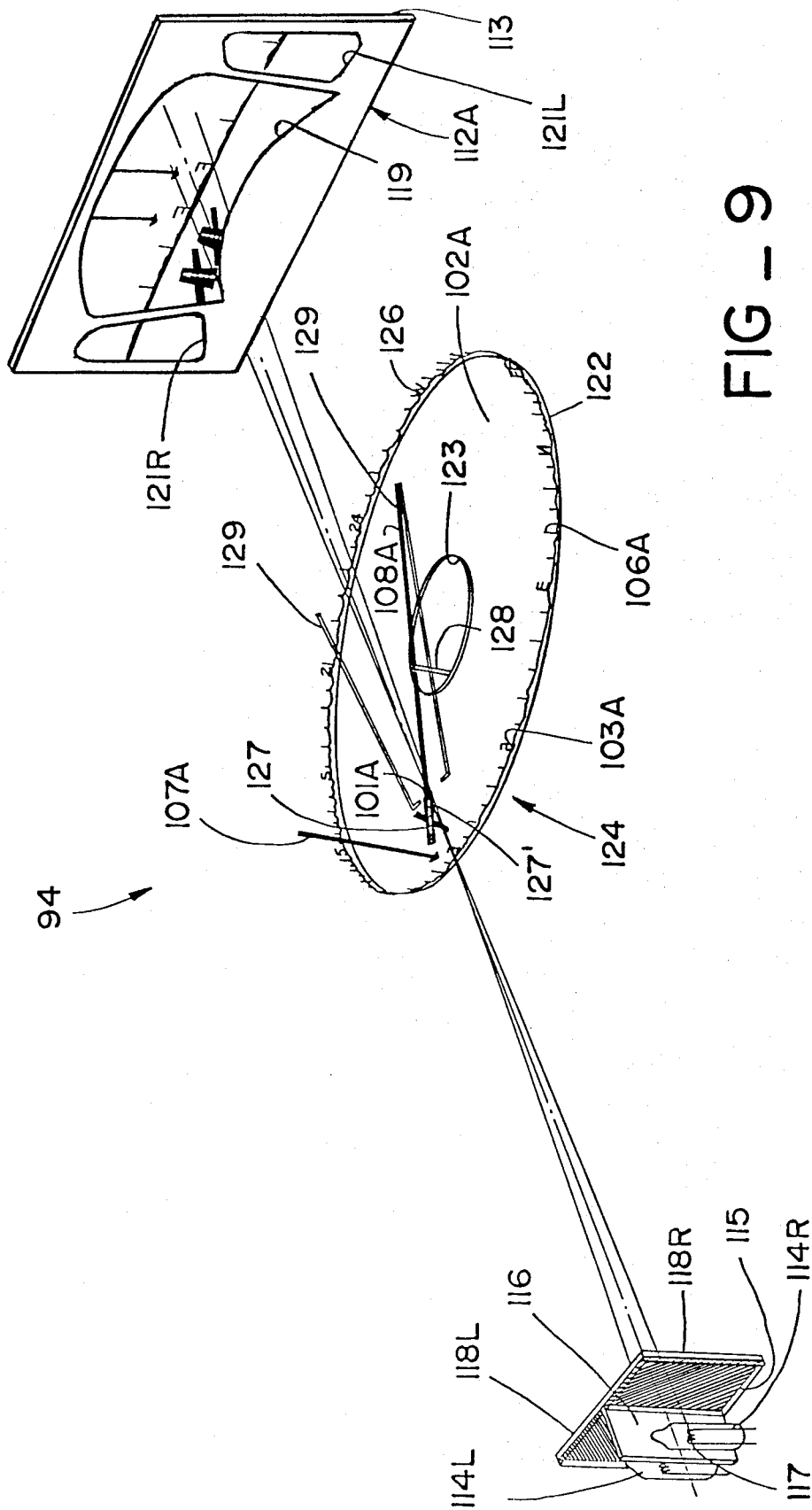
FIG_9

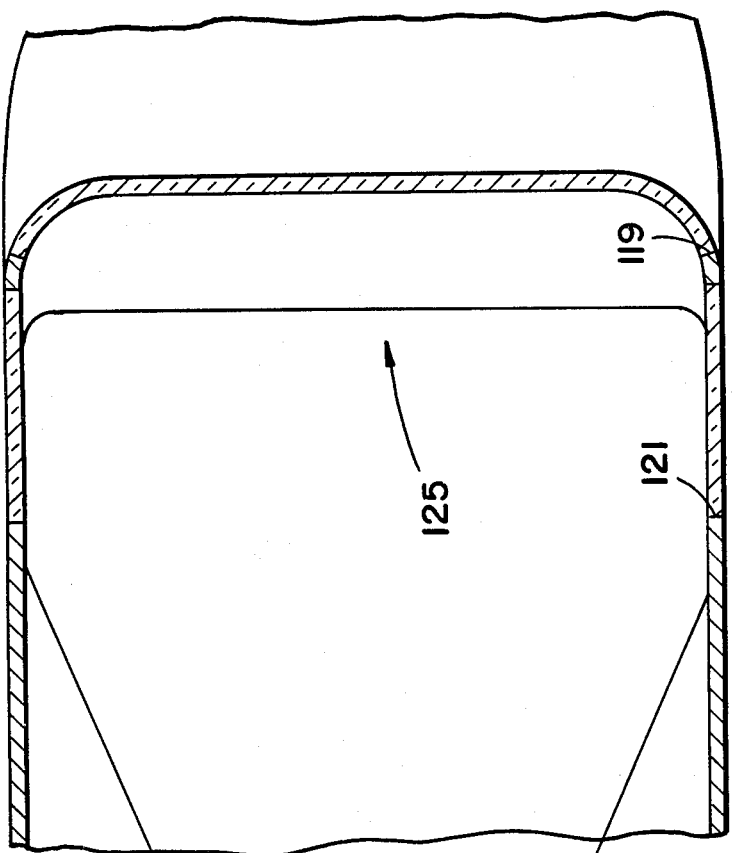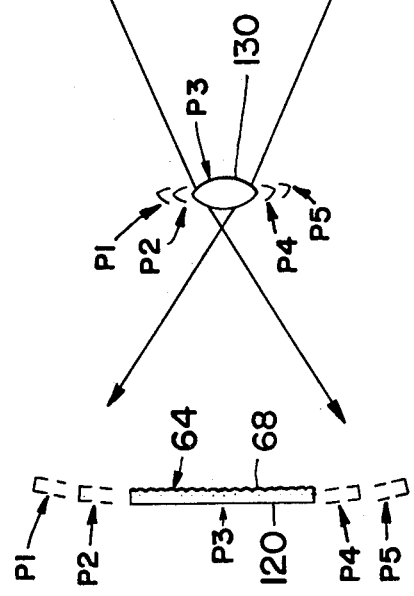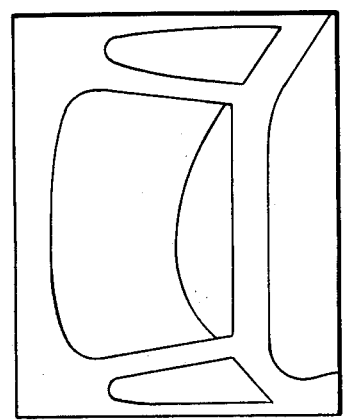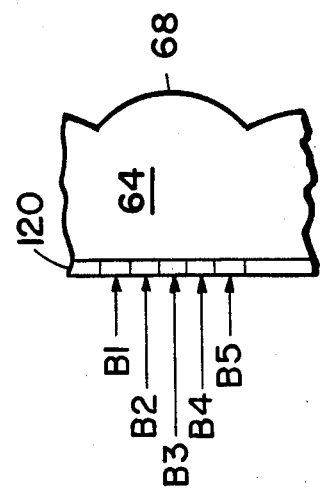

LIGHT ANALYZING LENTICULAR SCREEN FOR VIEWING STEREO IMAGES

This is a division of Ser. No. 651,202, filed Jan. 21, 1976, now U.S. Pat. No. 4,172,632 issued Oct. 30, 1979.

BACKGROUND OF THE INVENTION

This invention relates to stereoscopy and more particularly to viewing screen constructions for enabling perception of projected stereo pair images in seemingly three dimensional form. Such screens may be used, for example, for entertainment purposes or in other contexts such as in navigation aids in which three-dimensional shadow images are utilized to facilitate the instrument navigation of aircraft or other vehicles where the visibility of landmarks is limited or absent.

The viewing of projected stereo pair images requires that each eye of a viewer perceive only a separate one of the two images of the pair in order for the perception to be seemingly three dimensional. Where the stereo pair images are projected towards a screen, it is customary to code the light which defines one image in a first way and to code the light which defines the other image in a different way. Two different colors of light may be used for example or the light for each image of the pair may be differently polarized. To block each kind of light from a separate eye of the viewer, it has been a common practice to require that the viewer wear light analyzing eyeglasses. Such eyeglasses can be uncomfortable and may produce adverse physiological reactions. If the viewer wishes to look away from the screen momentarily, the eyeglasses impede perception of the surrounding scene unless they are removed. This can be more than an inconvenience in some forms of 3D image viewing. For example where the pilot of an aircraft is using an instrument navigation aid which presents data in the form of an artificial three dimensional shadow representation of the situation of the aircraft, it is important that the pilot be able to look elsewhere quickly and clearly.

SUMMARY OF THE INVENTION

This invention provides a light-analyzing lenticular screen construction for intercepting a mixture of light having a first characteristic and light having a second characteristic and for causing one eye of an observer to perceive only said light having the first characteristic and for causing the other eye of said observer to perceive only light which has the second characteristic.

The construction includes a first plurality of linear parallel spaced apart light analyzing elements which are at least partially transparent to light having the first characteristic and opaque to light having the second characteristic and which are alternated with a second plurality of linear parallel spaced apart light analyzing elements the second plurality of elements being at least partially transparent to light having the second characteristic and opaque to light having the first characteristic. A lenticular screen disposed parallel to the first and second light analyzing elements has lens means for restricting visibility of the first elements to one eye of the observer and for restricting visibility of the second elements to the other eye of the observer.

The invention may be used to create unique optical effects for entertainment purposes and also has other usages such as aiding in the navigation of aircraft or other vehicles. In one usage of the invention, an instrument landing system approach to the landing of an aircraft or the like is facilitated by presenting the pilot with a realistic appearing three-dimensional image which may include a depiction of a distant airport and preferably a depiction of an aircraft or at least a portion of an aircraft such as a cockpit windshield through which the airport depiction is seen. Mechanisms are provided which manipulate the components of the depicted scene in response to radio location signals, course signals, gyroscope signals and the like to cause the depicted aircraft to maintain the same apparent spatial relationship to the depicted airport as the real aircraft bears to the real airport at which it is to be landed. Three-dimensional representations of designated course and glide slope may also be injected into the artificial scene if desired and the earth's surface including a horizon line and compass headings may also be represented in the scene.

The pilot need not rely on his interpretations of conventional instrument flight aids which do not provide a realistic visual picture of the aircraft's relationship to the earth and to an airport. Instead, the pilot may simply fly the depicted aircraft to the depicted airport using the controls of the real aircraft. Provided legal landing weather minimums exist, as the final stage of the landing begins, the pilot need only glance up and out through the real windshield to perceive the real airport in the same relationship to the real aircraft as is depicted in the artificial scene.

To create an apparent three-dimensional shadow image of an object, the object is situated between a screen and a pair of spaced-apart light sources. Light from one source is coded in one way, by polarization or color filtering for example, while light from the other source is coded in a different way by being differently polarized or filtered to be of a different color for example. The shadow of the object as cast upon the screen then consists of right and left penumbras each partially illuminated by light coded in a differentiatable manner and, under many conditions, a central dark area or umbra.

The present invention provides an analyzing lenticular screen which causes light originating from one source and its associated shadows to be directed to only one eye of the viewer while light originating from the other source and its associated shadows is received only by the other eye of the viewer, provided the viewer is situated in a predetermined position relative to the lenticular screen. Where the invention is used in an aircraft flight or landing aid as described above, the light sources, coding means, screen, and the objects which create the appearance of the earth, an airport and other components of the artificial scene are arranged for installation in the cockpit of the aircraft together with the mechanisms which manipulate the objects in response to location and attitude signals.

Under the conditions described above, the human biovisual system perceives the shadow pattern on the screen as a three-dimensional, seemingly solid representation of the object or objects. The apparent distance of the shadow image of an object from the viewer is determined by the position of the object relative to the light sources and the screen. By effecting relative movement of one or more of these elements, the 3D shadow may be caused to appear to enlarge and move nearer to the viewer or to shrink and recede.

BRIEF DESCRIPTION OF THE DRAWINGS

In the accompanying drawings:

FIG. 1 is a diagrammatic perspective view illustrating equipment and techniques for causing an observer to perceive a seemingly solid shadow of an object, FIG. 2 is a diagrammatic plan view of modified apparatus for causing perception of a seemingly solid or 3D shadow image and wherein the shadow image is perceived as being within the context of a previously filmed 3D or stereoscopic still or motion picture scene, FIGS. 3A, 3B and 3C respectively depict the total shadow pattern cast on the screen of FIG. 2, the portion of the shadow pattern perceived by the right eye of a viewer and the portion of the shadow pattern perceived by the left eye of the viewer, FIG. 5 is a diagrammatic plan view of a usage of the invention wherein the viewer need not wear light-analyzing eyeglasses as employed in the system of FIGS. 1 to 3, FIG. 6A is an enlarged broken-out perspective view showing a suitable detailed construction for a light-analyzing lenticular screen used in the system of FIG. 5 and FIG. 6B diagrammatically illustrates optical effects within the assembly, FIG. 9A is a perspective view of certain basic internal elements of the navigation instrument of FIG. 8 and illustrates operating principles thereof, FIG. 10A illustrates a light-analyzing lenticular screen and techniques for forming the screen for use in the system of FIG. 9A, FIGS. 10B and 10C illustrate stereo images of an aircraft cabin as presented to separate eyes of a viewer by the screen and FIG. 10D is an enlarged plan section view of a portion of the screen.

DESCRIPTION OF PREFERRED EMBODIMENTS

Figure 8:
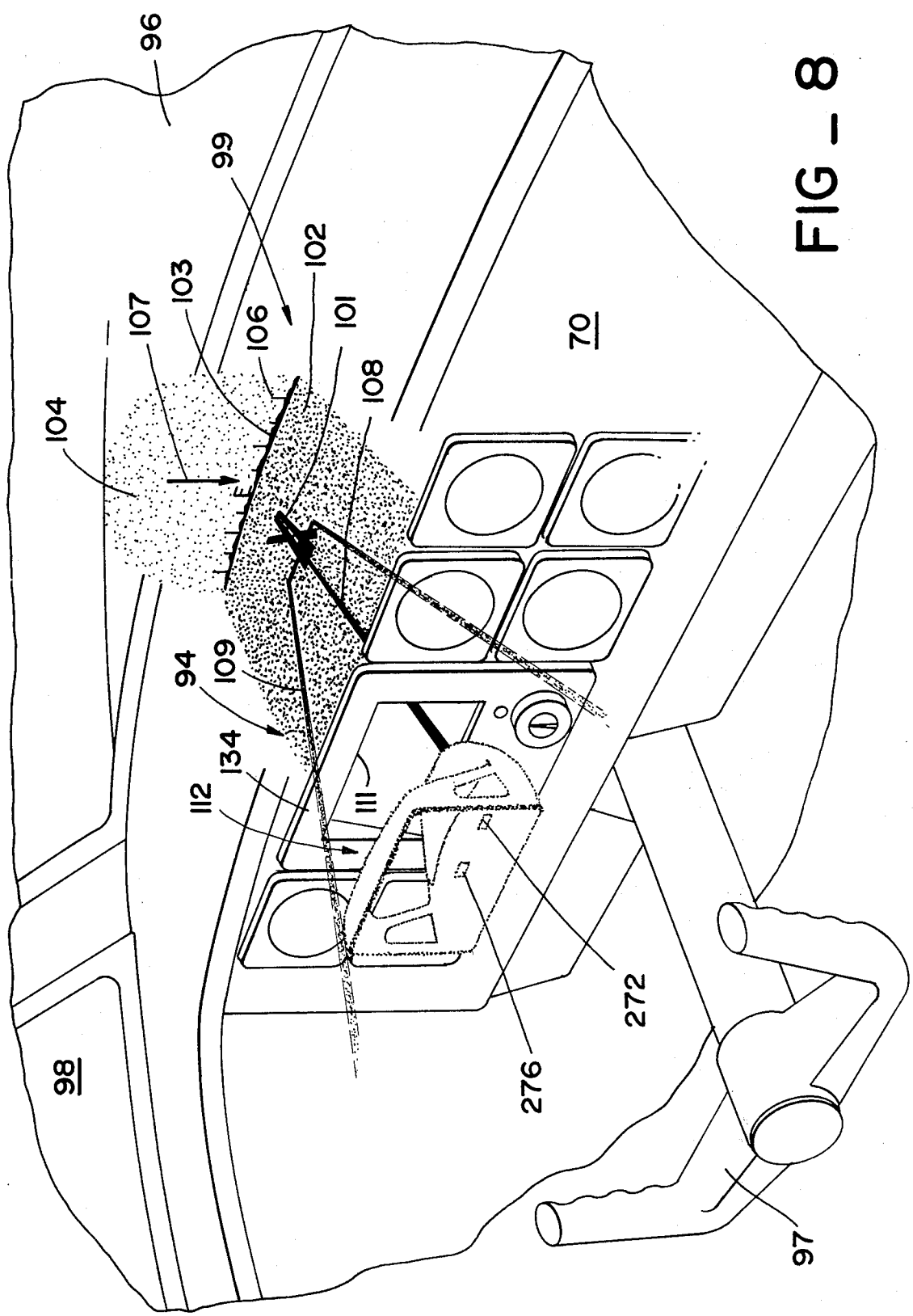
FIG. 8 is a perspective view of the instrument panel region of an airplane cabin having a navigation instrument in accordance with the present invention and illustrating, to the extent possible in a two-dimensional drawing, the nature of an artificial scene which may be presented to the pilot to facilitate instrument navigation of the airplane.

Referring initially to FIG. 1, basic techniques for causing an observer or viewer 31 to perceive a seemingly solid or three-dimensional shadow 32S of an object 32 are illustrated. The object 32 in the example depicted in FIG. 1 is a solid sphere but any other opaque or partially opaque object or objects of any configuration may also be employed. The object may be a moving one, such as a human performer, in which case the three-dimensional shadow 32S is perceived as undergoing related movement including movements towards or away from the abserver.

To create the apparent three-dimensional shadow image 32S, the object 32 is disposed between a screen 33 and a pair of spaced-apart light sources 34L and 34R. Light sources 34 are arranged to direct light towards the object 32 and the more distant screen 33 and in most instances are spaced apart a distance corresponding at least approximately to the average spacing of the two eyes of human observers although greater or less spacing of the light sources may be used if exaggerated or diminished perspective of the shadow image 32S as perceived is desired.

Light from each of the two sources 34L and 34R is differently coded so that light from one source may be restricted to one eye of the observer 31 while light from the other source may be restricted to the other eye of the observer. In the example depicted in FIG. 1, this is accomplished by inserting a polarizing filter 36R in front of source 34R while another polarizing filter 36L is inserted in front of source 34L, with the polarization planes of the two filters being oriented at right angles to each other. As will be pointed out in connection with other examples of the invention, the coding of the light may also be accomplished anaglyphically by using filters of different colors instead of the polarizing filters of the arrangement of FIG. 1.

The screen 33 in this instance is formed of a flat translucent material since rear projection techniques are utilized in the example of FIG. 1, the observer 31 being situated on the opposite side of the screen from the light sources 34 and the object 32. Since polarization is utilized for light coding in this example, the screen material should be of a non-depolarizing composition. Coated glass and various known plastics are suitable materials for the screen 33. In an anaglyphic system where color rather than polarization is used for light coding, frosted glass or thin paper are also suitable rear projection screen materials.

Under the above-described conditions, object 32 creates a two-dimensional shadow pattern 37 on the screen which consists of a central umbra area 37U in the region where light from both sources 34 is blocked by the object 32, a partially illuminated left penumbra area 37L and a partially illuminated right penumbra area 37R. Left penumbra 37L occupies the area of the screen which receives light from source 34L but no light from source 34R while the right penumbra 37R is defined by the area of the screen which receives light from the source 34R but none from source 34L. Since the light received at the screen in each penumbra area originates at only a single one of the light sources, the light in each penumbra is differently coded, by exhibiting different polarization planes in this particular example. The fully illuminated area 38 of the screen, outside the shadow pattern area 37, receives light from both sources 34 and thus includes light coded in both ways.

If the observer 31 were simply to view the screen 33 without the assistance of means, such as analyzing eyeglasses 39, for restricting light originating at one source 34 to one eye and for restricting light originating at the other source to the other eye, the observer would simply perceive the two-dimensional shadow pattern on the screen in the form described above. The observer 31, under those conditions, would see the umbra 37U as a flat dark area, the two penumbras 37 as partially illuminated flat areas and the remainder of the screen as a more brightly illuminated area. This would not provide a highly realistic three-dimensional shadow representation of the object 32.

The eyeglasses 39 in this example have a polarization analyzing right lens 39R with a polarization plane oriented similarly to that of the left light source polarizing filter 36L and have a left polarization analyzing lens 39L in which the polarization plane is oriented similar to that of the right light source polarizing filter 36R. Therefore, when wearing the eyeglasses 39, the right eye of the observer 31 can see only light which originated at left light source 34L while the observer's left eye can receive only light which originated at the right light source 34R.

While wearing the eyeglasses 39, each eye of the observer perceives only a portion of the total shadow pattern 37 on the screen. The observer's right eye perceives the central umbra area 37U and the right penumbra area 37R as a continuous dark area which is of circular configuration in this particular example owing to the spherical shape of the object 32. The observer's right eye does not perceive the left penumbra 37L since it is illuminated by light from left light source 34L and that light may pass through the right lens 39R of the eyeglasses. Thus to the observer's right eye, the left penumbra 37L appears as a lighted area continuous with the lighted area 38 which lies outside the shadow pattern 37 on the screen. The observer's right eye does not detect any difference in the degree of illumination of left penumbra 37L and the surrounding fully illuminated area 38 since one-half of the light falling on area 38 is blocked from the right eye by analyzing lens 39R.

For similar reasons, the left eye of the observer perceives only the central umbra area 37U of the shadow pattern on the screen together with the left penumbra area 37L which are jointly perceived as a single circular dark area in the example. The observer's left eye does not perceive the right penumbra area 37R since the left eye perceives the illumination of this area by right light source 34R.

Owing to the separation of the two light sources 34, the portion of the two-dimensional shadow pattern of object 32 on screen 33 that is perceived by one eye of the observer is cast from a slightly different angle than the portion of the shadow pattern perceived by the other eye. If the two light sources 34 are considered to be analogous to the eyes of a viewer of the object 32, then one light source may be characterized as looking slightly more around one side of the object 32 while the other light source is looking slightly more around to the other side of the object. The binocular human biovisual system reacts to slightly disparate views of a scene at each eye by perceiving the scene three-dimensionally. In other words the impression that various portions of the scene are at different distances from the viewer is created. Although the observer 31 in the example of FIG. 1 is situated on the opposite side of the screen 33 from light sources 34, the analyzing eyeglasses 39 cause a perception similar to what would occur if the observer's eyes were located in the position of the light sources 34 except insofar as it is a shadow outline that is perceived rather than the actual object 32. Consequently the shadow image 32S is perceived as being solid, that is the observer perceives different portions of the shadow image as apparently being at different distances from his eyes. In this particular example the shadow image 32S has the general appearance that a solid black ball situated in front of the observer would have. If the object 32 is another person such as a performer, then the shadow image 32S appears somewhat like a black statue of the performer, illuminated from behind by more than one light source, although this analogy is strictly true only if the performer does not move. Any movement of the performer causes the three-dimensional shadow image to move in a similar, but mirror-imaged, manner unlike a fixed statue. With the observer on the opposite side of the screen from the object 32 under the conditions depicted in FIG. 1, the solid-appearing shadow image 32S is perceived as if viewing the actual object 32 from the side of the object that is remote from the observer, that is from the point of view of the light source 34, except for the mirror image reversal effect.

In practice there may be a large number of observers 31 and more than one real object 32. The system may be used to create a variety of unique entertainment effects. A theater or nightclub audience, for example, may be caused to perceive seemingly solid animated images of any of various kinds of performers, such as pantomimists, dancers or the like seemingly floating in space. The system also has uses in addition to entertainment as will hereinafter be described.

In this discussion of the method and suitable apparatus for causing one or more viewers to perceive what appear to be solid three-dimensional shadows, the term "perceiving" or "perception" has been used with reference to the viewer's reactions instead of referring to "seeing" the shadow image although the latter term might be loosely employed for the same purpose. Strickly speaking, one does not "see" a shadow whether of the 3D form or the conventional two-dimensional form. A shadow is actually a lack of seeing within a certain area or region.

Referring now to FIG. 2, a variation of the system is depicted wherein anaglyphic or color filtering means are used for coding light instead of polarization techniques. FIG. 2 further illustrates techniques by which 3D shadow images of inanimate or animate objects may be injected into the context of a previously filmed stereoscopic still or motion picture presentation, the shadow injection techniques being applicable to systems using polarization light coding, as described above, as well as to an anglyphic system of the kind depicted in FIG. 2.

In the example of FIG. 2, the spaced-apart light sources 34L' and 34R' are the objective lenses 41R and 41L which define the dual optical projection paths of a 3D still or motion picture projector containing film 42 on which slightly disparate views of a scene have been recorded, light from suitable sources 43 being directed through the film and each objective lens 41 in order to project disparate stereo-images of the scene on a screen 33' in the known manner.

Color coding for restricting perception of light originating at source 34L' to the right eye 44R of a viewer and for restricting perception of light from the other source 34R' to the left eye 44L of the viewer in this example is provided by color filters 46L and 46R respectively which transmit different wavelengths. Filter 46L may be a red filter disposed between source 34L' and screen 33' while filter 46R may be a blue filter situated between source 34R' and the screen. If a three-dimensional object 32', again represented as a sphere for purposes of the example only, is disposed between the light sources and the screen, the resulting two-dimensional shadow pattern 37' on the screen would appear as shown in FIG. 3A to an observer having no color coded eyeglasses or other analyzing means, FIG. 3A being taken from the point of view of an observer situated on the opposite side of the translucent screen from the light sources and the real object. The shadow pattern 37' again consists of a central dark umbra 37U', a right penumbra 37R' and a left penumbra 37L'. In this connection it may be noted that the right penumbra appears on the left from the point of view of FIG. 3A while the left penumbra appears on the right. This results from the fact that FIG. 3A shows the side of the screen which is opposite from the light sources. The designations "right" and "left" are retained for the penumbras in FIG. 3A to be consistent with FIG. 2 and also since the right penumbra 37R' is perceived as shadow only by the right eye 44R of the viewer for reasons which will be explained.

Referring again to FIG. 2, in order to cause light originating from source 34L' to be perceived only by the right eye 44R of the viewer, another red filter 47R is disposed in front of the viewer's right eye. In order to cause light from source 34R' to be received only by the viewer's left eye 44L, a green filter 47L is situated in front of the left eye.

The reason that the color of left eye analyzing lens filter 47L in this example does not match that of coding filter 46R at the right light source 34R' is that the combination of filter colors described above results in the shadow image and the 3D scene from film strip 42 being perceived in shades of grey, in the so-called "black and white" presentation familiar to movie and television viewers. The projected image which reaches the screen through coding filter 46L appears in shades of red whereas the disparate image which reaches the screen through coding filter 46R appears in shades of blue. To an observer not equipped with the analyzing filters 47, the areas of the screen 33' outside the umbra or penumbra shadows of object 32' would appear in shades ranging from red through pink, purple to blue, depending on the contents of the projected scene. The left penumbra 37L' would appear solely in red while the right penumbra would appear solely in blue. The central umbra 37U' would appear black as no illumination reaches the umbra area.

Red analyzing lens 47R passes only light in the red regions of the spectrum. Consequently, lens 47R causes the right eye to perceive the image on the screen solely in shades of red or pink except for the umbra shadow area 37U' and the right penumbra 37R' both of which are perceived as black since the blue light of the right penumbra cannot pass through the red analyzing lens 47R. As the analyzing lens 47L at the left eye is green, the left eye perceives the scene on the screen in shades of cyan except for the shadow umbra area 37U' and the left penumbra area 37L' which are perceived as black inasmuch as the red illumination of the left penumbra cannot pass the green filter at the left eye. The scene is perceived by the left eye in shades of cyan since blue light observed through a green filter appears in that hue. Where one eye is presented with an image in shades of pink and the other eye is presented with the image in shades of cyan, the human biovisual system inherently reacts by combining the colors to perceive the scene in shades of gray.

Thus, the observer, when equipped with the analyzing lenses 47 or other analyzing means, perceives a filmed three-dimensional scene except that injected into the scene is a seemingly solid shadow image 32S' of object 32'. If the object 32' is an animate human performer an arresting effect of something alive moving into a previously filmed scene is created.

The injection of the shadow image 32S' into the filmed scene results from effects essentially similar to those previously described. Upon focusing upon the screen 33', the left eye 44L of the observer perceives a shadow pattern consisting of the central umbra 37U' and the left penumbra 37L'. As the right penumbra 37R' is not perceived by the left eye the total shadow image appears to that eye to be displaced to the right as depicted in FIG. 3C. For similar reasons the right eye perceives only the central umbra 37U' together with the right penumbra 37R', as depicted in FIG. 3B, and the perceived shadow area appears shifted to the left. Presented with these disparate slightly spaced-apart perceptions of the shadow pattern on the screen, the viewer's biovisual system synthesizes a solid three-dimensional shadow 32S' as shown in FIG. 2. For the reasons previously discussed, the 3D shadow image 32S' in this particular example appears to be between the viewer and the screen, while objects in the background 3D movie or still picture scene are perceived as being at varying distances from the viewer depending on conditions under which the filmed scene was photographed.

Using the combined stereo film and three-dimensional projection technique, four combinations of presentation are possible with respect to the apparent location of objects in the scene. These include: stereo film scene behind the screen and 3D shadow behind the screen, stereo film scene behind the screen and 3D shadow in front of screen, stereo film scene in front of screen and 3D shadow in front of screen, and stereo film scene in front of screen and 3D shadow in back of screen.

The in-front-of or behind-the-screen perception of the stereo film scene is a factor of circumstances at the time of photography as understood in that art. The in-front-of or behind-the-screen 3D shadow is a factor of light coding. For example, using two 35 mm. slide projectors, each oppositely light coded, and using analyzing glasses to view the superimposed stereo film images, a 3D image will be perceived. If the positions of the projectors are then interchanged so that the left projector is on the right and the right projector is on the left the same filmed 3D image will be seen as before. But if a shadow-casting object is disposed in the projection paths in the first instance the shadow image appears to be on the opposite side of the screen from where it appears to be in the second instance. In other words, the disparate stereo views on the film have not changed but the disparate shadows have changed since the shadow-casting coded lights have traded places.

Where an image is injected into the context of a pre-existing scene in conventional movie or television systems, by means of matting or the like, problems are often encountered from fringing or tear-through effects. The boundary between the injected image and the background often appears to have unnatural emphasis or to exhibit optical effects which make the superimposition apparent to a viewer. It is of interest that in the present system as described above, the fit of the 3D shadow images 32S' into any previously filmed 3D scene displayed on the screen 33' is exact and free from the effects described above. This results from the fact that the injected 3D shadow image is created simply by the blocking out of light from the filmed background scene.

The system described above with reference to FIG. 2 produces a 3D shadow image 32S' which appears black to the observer. It is possible to produce such shadow images having apparent coloration by utilizing objects 32' formed of a material partially transparent to the light transmitted through one of the color coding filters 36 but which is less transparent or opaque to the color of light received from the other filter. If the object 32' is formed of a material which transmits some red light, such as appropriately colored glass for example, some red light will be transmitted into the shadow pattern area 37U' on the screen and impart a similar coloration to the shadow image 32S' perceived by the viewer and refraction effects may appear in and around the image depending on the configuration of the object. Other colorations may be imparted to the shadow images by utilizing other combinations of colored filters 46, analyzing lenses 47 and objects 32' formed of materials which are semi-transparent to the desired wavelengths.

The range of shadow image coloration available by such techniques is increased if light coding by polarization, as previously described with reference to the system of FIG. 1, is employed together with color filters situated between the light sources and a semi-transparent colored object, since the color filters and eyeglass lenses then need not be limited to those which will enable restriction of light from each source to a single eye of the observer.

The 3D shadow-creating systems as described above with reference to FIGS. 1, 2 and 3, cause the perception of the shadow image as apparently being situated between the observer and the screen. If, with reference to the system of FIG. 1 for example, the light coding is reversed, then the shadow image is perceived as being located behind the screen. In other words, if the polarizing filters 36R and 36L of FIG. 1 are interchanged or if the lenses 39R and 39L of the viewer's eyeglasses are interchanged, the observer 31 will then perceive the shadow image 32S as being situated in the general region of the real object 32. The real object itself is not seen because of the presence of the screen. Such reversal of the filters 36 or the eyeglass elements 39 causes the observer's right eye to perceive the left penumbra 37L instead of the right penumbra while the left eye perceives right penumbra 37R. Under that condition the lines of sight of the observer's two eyes do not converge and cross in front of the screen but, instead, converge at a point situated behind the screen. The observer's biovisual system then construes the location of the 3D shadow image to be at that convergence point behind the screen.

In the several examples of 3D image production systems described above, perception of the 3D shadow image depended upon the wearing of a pair of specialized eyeglasses or an equivalent disposition of right eye and left eye analyzing filters between the observer and the screen. Under some circumstances the use of such glasses may be inconvenient or undesirable. It is possible to dispense with the need for eyeglasses or the like, provided that the observer is positioned at a known point with reference to the screen. An example of such a system is depicted in FIG. 5.

The object from which a shadow is to be derived, represented by a cube 56 in FIG. 5, may again be situated between a screen assembly 62 and spaced-apart light sources 58R and 58L in the manner previously described, the light from source 58R being coded by polarization or color filtering and the light from the other source 58L being differently coded by being polarized in a different plane or by passage through a differently colored filter in accordance with the techniques previously described. The object 56 will again cast a shadow pattern on screen 62 consisting of a central dark umbra 59, a left penumbra 59L illuminated only by coded light from source 58L and a right penumbra illuminated only by differently coded light from source 58R.

Both eyes 61R and 61L of an observer stationed on the opposite side of the screen 62 would of course perceive the same two-dimensional shadow pattern on the screen in the absence of some means for blocking perception of the one penumbra from the right eye 61R and for blocking perception of the other penumbra from the left eye 61L. This blocking of perception of one penumbra from each eye, without requiring analyzing eyeglasses, is accomplished by utilizing a screen assembly 62 which may be characterized as being a light-analyzing lenticular screen and which may have a construction as illustrated in FIG. 6 which is an enlarged broken-out elevation view of one corner of the screen assembly.

As best seen in FIG. 6A, screen assembly 62 consists of a lenticular plate 64 having a flat planar light-analyzing element assembly 66 disposed against a light-diffusing surface 65 of the lenticular plate which is remote from the viewer of the screen assembly. Lenticular plate 64 may be essentially of the form heretofore used in the manufacture of 3D postcards and the like and thus consists of a transparent material having a series of parallel, vertical, partial cylindrical lens elements 68 formed in the surface which faces the viewer. The cross-sectional curvature of each such partial cylindrical lens surface provides a focal point 67' located directly behind that particular lens surface and closer to the light-diffusing back surface 65 of the plate than to the lens surface.

Light-analyzing element assembly 66 has parallel vertical light-analyzing bands 67 of which alternate bands 67R are transparent to light coded in a first way while being opaque to light coded in a second way. The intervening bands 67L are transparent to light coded in the second way and opaque to light coded in the first way. For example, in an anaglyphic system, bands 67R may be composed of red color filter material while bands 67L are composed of green or cyan color filter material. Where polarization is used for light coding, bands 67R may have a first polarization plane while bands 67L have an opposite polarization plane. One of the bands 67R and an adjacent one of the bands 67L extend along surface 65 behind each partial cylindrical lens 68 at opposite sides of the focal point 67' of the associated lens except that there may be a slight displacement of the boundary between adjacent bands, relative to the focal point as will hereinafter be discussed in more detail. Each such band 67 preferably has a width substantially one-half that of the associated partial cylindrical lens although narrower bands may be employed in some cases as will also be hereinafter discussed. The width of each partial cylindrical lens 68 and the width of the light-analyzing bands 67 are exaggerated in the drawings for clarity of illustration and in practice such widths may typically be a few thousandths of an inch.

Considering now the operation of the light-analyzing lenticular screen assembly 62, reference should again be made to FIG. 5. Solid arrows 65R and 65L respectively represent the optical path from the right eye 61R and left eye 61L of an observer to a specific single one 68' of the partial cylindrical lenses of the screen assembly. Owing to the extremely small width of the specific partial cylindrical lens 68, relative to the spacing between the two eyes of the observer, these optical paths 65 are necessarily convergent. The optical paths 65 from each eye to a specific individual lens should be distinguished from the lines of sight or optical axes of the two eyes, represented by dashed arrows in FIG. 5, which are also usually convergent as previously discussed but which do not usually converge on a single one of the partial cylindrical lenses. Bearing in mind the convergence of the optical paths 65 from the observer's two eyes to any single one of the partial cylindrical lenses, reference should now be made to FIG. 6B wherein it may be seen that the lens 68' acts to limit visibility along path 65R to a band 67R while limiting visibility along path 65L to a band 67L. Thus only light-analyzing bands 67R are visible to the observer's right eye while only light-analyzing bands 67L are visible to the observer's left eye. While the optical paths 65 to every lens 68 have not been depicted in FIG. 6B in the interests of clarity of illustration, similar considerations apply to each of the other lenses 68 and the associated pairs of bands 67. As a consequence only light transmitted through bands 67R reaches the right eye of the observer while only light transmitted through bands 67L reaches the observer's left eye.

Consequently, referring again to FIG. 5, the viewer's right eye may perceive only the left penumbra 59L and umbra 59 of the shadow pattern on screen 62 while the viewer's left eye 61L may perceive only the right penumbra 59R together with the umbra 59. In accordance with the principles hereinbefore described, the observer then perceives a seemingly solid shadow image 56' of object 56 apparently situated at the point of convergence of the lines of sight of the two eyes as represented by dashed arrows in FIG. 5. Using the light coding employed in FIG. 5 for purposes of example, this point of convergence is behind the screen. However, as previously described, if the coded light sources 58L and 58R are then interchanged, right eye 61R will perceive light penumbra 59R together with penumbra 59 while left eye 61L perceives left penumbra 59L together with the umbra and, under that condition, the shadow image 56' will be perceived as being between the observer and the screen inasmuch as the lines of sight of the two eyes then cross in front of the screen.

Turning now again to FIG. 6B, the above description of the optical paths 65 between the two eyes of an observer and the light-analyzing bands 67 was initially described with respect to one of the partial cylindrical lenses 68' which is centrally situated on the screen assembly. At the centermost one of the partial cylindrical lenses 68' the two optical paths 65 enter the lens surface at equal but oppositely inclined angles. However, upon considering the optical paths 65L' and 65R' between the observer's two eyes and a representative lens 68'' situated towards one side of the screen assembly 62 it may be seen that this symmetrical relationship does not exist. If lens 68'' is situated near the left side of the screen from the observer's standpoint, then the optical paths 65R' and 65L' enter the screen at changed angles. As viewed in FIG. 6B, optical paths 65L' and 65R' appear shifted counterclockwise relative to paths 65L and 65R respectively since both paths 65L' and 65L originate at a single point, the left eye of the observer, while paths 65R' and 65R both originate at the right eye. Accordingly, it is preferable that the paired light-analyzing bands 67L and 67R be displaced progressively more leftwardly relative to the focal point of associated lens 68 as the left edge of the screen assembly 62 is approached. In other words, the paired bands 67L' and 67R' associated with the centermost cylindrical lens 68' are directly behind that centermost lens as is evident from arrow A in FIG. 6B while the bands 67R'' and 67L'' which coact with a lens 68'' at the left portion of the screen assembly are shifted to the left relative to the associated lens 68'' as may be seen by reference to arrow B. For similar reasons it is preferable that the bands 67 be displaced progressively more to the right as the rightward edge of the screen assembly is approached.

Considering the small width of the partial cylindrical lenses 68 and associated light-analyzing bands 67, it might appear at first consideration that manufacture of the screen assembly 62 would be a very tedious and exacting task. However, one convenient method for preparing such a screen assembly simply makes use of a color-sensitive photographic film transparency to form the light-analyzing band assembly 66. If the unexposed color film is disposed in position on the back surface 65 of the lenticular plate 64, in darkness, the desired light-analyzing bands may be established in the proper position by simple photographic techniques. In particular, with reference to FIG. 5, the screen assembly 62 including the unexposed film may be situated in a dark room with a red light source at the position defined by the observer's right eye 61R in FIG. 5. Upon momentarily activating the red light source, red light is inherently directed to the desired positions of bands 67R on the film by the partial cylindrical lenses of the lenticular plate. Upon development of the film, red light transmissive bands will be situated on the film in the positions described above. Similarly, during the exposing process, a green light source may be positioned at the point defined by the observer's left eye 61L in FIG. 5 and following development, green light transmissive bands, alternating with the red bands, will be present on the film transparency in the desired positions as described above.

If the screen assembly 62 and the red and green light sources remain stationary during this exposing process, the resulting alternating red and green bands on the light-analyzing element assembly 66 will be extremely narrow and will be separated by sizable unexposed spaces owing to the anamorphic focusing effect of the partial cylindrical lenses 68. While this is a workable arrangement, it requires that an observer be very precisely positioned, in the transverse direction, relative to the screen assembly in use in order to properly perceive the desired image. In many instances, it is preferable that there be some tolerance to lateral movement of the observer's head. This may be provided for during the above-described exposing process by shifting the light sources laterally relative to the screen to spread out the bands of red and green exposure on the film transparency. The extent of such lateral shifting should not exceed the spacing between the two eyes of the observer who will later utilize the screen assembly, 64 millimeters being a typical value for human interocular spacing. If, for example, during exposure to red light, the red light source is initially positioned at the exact location planned for the right eye 61R of the future observer, then the light source may typically be moved as far as 32 millimeters to the right from that position and then 32 millimeters to the left from that position to spread out the red light transmissive bands which will be present on the film transparency after exposure. A similar operation may be performed during the green light exposure. This will typically provide for a lateral positional tolerance of up to about 6.4 centimeters for the observer's head during use of the screen.

The photographic process described above is one technique for producing a light-analyzing element assembly 66 suitable for use where the light from the two sources is coded by being passed through differently colored filters. An essentially similar process may be used where coding is done with polarizing filters since techniques for converting actinically exposed areas of a film transparency into polarized light filtering areas, by injection of polarizing dyes, are known to the art. Alternately, the light-analyzing element assembly 66 may be formed of two superimposed sheets of polarized filter film which have polarization planes at right angles to each other. Techniques for destroying the polarization capabilities of predetermined areas of such films by laser beam irradiation are also known to the art. Thus the areas of bands 67R may be depolarized on one of the two films by this technique while the areas of bands 67L may be similarly depolarized on the other film. Superimposing the two films at the back of the lenticular plate 64 then provides a screen assembly suitable for use in a system where light coding by polarization is utilized.

As previously pointed out, the method and apparatus of the invention may be utilized to create unique entertainment effects in theatrical or night club performances or the like and in conjunction with three-dimensional still or motion picture displays. Utility of the invention is by no means confined to the entertainment and amusement of audiences. An extremely valuable adaptation of the invention may be used to facilitate the guidance or navigation of aerial, land or sea vehicles under conditions where visibility of the real scene surrounding the vehicle is impaired or absent due to clouds, fog, darkness or other causes.

A system embodying elements of the above-described method and apparatus may be used, for example, to facilitate the instrument landing approach of an aircraft to a landing site as described in more detail in copending allowed U.S. application Ser. No. 651,202 of the present applicant, filed Jan. 21, 1976 and entitled METHOD AND APPARATUS FOR PRODUCING THREE DIMENSIONAL SHADOW IMAGES. Basically, this is accomplished by causing the pilot to perceive, three-dimensionally, an artificial scene which may include an apparent airport, landing strip or the like and which preferably includes realistic representations of other earth surface features including a horizon line if desired. A representation of an aircraft or of some portion of an aircraft such as a cockpit windshield may also be presented in the scene which is presented to the pilot. The apparent location and orientation of the depicted airport or the like relative to the observer-pilot may be repeatedly adjusted, in response to conventional radio locator signals, on board gyro signals, and the like, to cause the artificial scene to maintain correspondence with the real scene which the pilot would perceive from his aircraft or from a pilot behind his aircraft while approaching a real airport under visual flight. In order to enhance realism, the airport depicted in the scene may be caused to appear to enlarge and apparently become closer as the distance of the real aircraft from the real airport decreases. The orientation of the earth's surface, horizon line or the like as depicted in the scene may be repeatedly adjusted relative to the pilot or relative to an aircraft representation in the scene, in response to conventional aircraft attitude-measuring instrument signals, to enable the pilot to visually perceive such factors as pitch, roll and yaw of the real aircraft. Visual, stereoscopically perceived representations of the location of a selected course line and also compass headings, established glide slope patterns and the like may be injected into the artificial scene and may be adjusted as necessary to conform with the real situation of the real aircraft so that the pilot may perceive any deviation of the real aircraft from desired courses and headings, and the like. Referring now to FIG. 8, the navigation instrument 94 may be mounted at the instrument panel 70 of the cockpit or cabin of an aircraft preferably directly in front of the pilot's position, below the windshield 96 and above the yoke or control wheel 97.

The window 111 at the front of the navigation instrument 94 may be used by the pilot as a frame of reference against which to judge the orientation and distance of components of the artificial scene, the effect of flying an aircraft under visual conditions may be still further enhanced by injecting a three-dimensional apparent image 112 of an aircraft nose, cabin, windshield and side windows into the artificial scene so that the components of the scene as previously described are perceived as if viewed from an aircraft cabin, techniques for generating the three-dimensional aircraft cabin image in the scene being hereinafter described.

With respect to FIG. 8, it should be understood that true three-dimensionality cannot be accurately presented in a two-dimensional drawing nor can colors be realistically indicated in FIG. 8. The depiction of the artificial scene 99 in FIG. 8 is of necessity only an approximation of what is actually perceived by a pilot using the instrument 94.

Considering now certain of the basic components of instrument 94 by which the artificial scene 99 is generated, reference should be made initially to FIG. 9A. To free the pilot from any need to wear analyzing eyeglasses, the screen 113 employed in instrument 94 is preferably of the analyzing lenticular form, with provisions for directing oppositely polarized light to separate eyes of the viewer, as previously described. To cast shadows of objects, which are to appear in the artificial scene, on the screen 113, a pair of spaced-apart light sources 114R and 114L are situated on the opposite side of the screen 113 from the pilot in spaced-apart relationship to the screen. An opaque partition 116 is situated between the two light sources 114 to prevent light from one source from reaching the other. As definition in the shadow images is increased to the extent that the actual origin areas of light at the sources can be minimized, the light sources 114 are preferably each of the form having a small helical light-emitting filament 117 and are aligned with the helical axes of the filaments directed towards the screen 113.

In order to code light from the two sources 114 in opposite manners, a right polarizing filter 118R is disposed between source 114R and screen 113 in proximity to the source while another polarizing filter 118L is similarly disposed between source 114L and the screen. The polarizing planes of the two filters 118 are oriented at right angles to each other. To impart coloration to components of the scene, color filters 115 are disposed between the light sources 114 and the polarizing filters 118. Color filters 115 in this example are of the form which preferentially transmit wavelengths in the blue regions of the spectrum.

To provide a frame of reference for the pilot when viewing the artificial scene, which is similar to that which is present when one looks out through the windshield of a real aircraft, a flat opaque mask 112A is disposed against the surface of screen 113 which faces the light sources. Mask 112A has a central opening 119 with a configuration resembling that of the windshield of an aircraft except for an upwardly bowed lower edge and has additional openings 121R and 121L on opposite sides of opening 119 which are shaped to conform with the side windows of the cabin of an aircraft. The upwardly bowed curvature of the lower edge of central opening 119 provides for the impression of looking over the nose of an aircraft so that the artificial scene will conform more closely with the real view from the pilot's position in an aircraft.

If the mask 112A is simply a flat opaque element with cutout areas to define the openings 119 and 121, then the mask is perceived two-dimensionally in the artificial scene in contrast to other components of the scene. This does not interfere with the pilot's ability to form accurate judgments about the spatial relationship of other components of the scene and is an entirely workable arrangement. However, if the added realism of a three-dimensionally perceived aircraft windshield, nose and the like is desired as a foreground for the other components of the depicted scene, as shown in FIG. 8, this may be accomplished by using techniques similar to those heretofore used for enabling three-dimensional perception, without analyzing eyeglasses, of photographed scenes.

In particular and with reference initially to FIG. 10A, an unexposed sheet of photographic film 120 may be disposed against the flat side of the hereinbefore-described lenticular plate 64 of the screen assembly. The plate 64 including the unexposed film 120 may then be positioned transversely, in darkness, behind the pilot's position in the cabin 125 of an aircraft, or a model of such a cabin, which includes a windshield opening 119 and side window openings 121. An objective lens 130 may be disposed in front of lenticular plate 64 to focus an image of the forward portion of the aircraft cabin on the plate upon illumination of the cabin.

With the plate 64, film 120 and lens 130 positioned as described above, a photographic exposure may be made by momentarily illuminating the interior of the aircraft cabin 125 while protecting the film 120 from light received from any source other than through lens 130 and plate 64.

During such exposure, image data received from lens 130 is anamorphically compressed and recorded at spaced parallel zones of the film 120 by the lenticular plate 64 as hereinbefore described. If the exposure is made with the lenticular plate and the lens 130 at the centered position P3 shown in solid lines in FIG. 10A, image data for that exposure is recorded at a narrow band behind each partial cylindrical lens 68 of plate 64 but the lateral position of the band behind each partial cylindrical lens is slightly different since light from objective lens 130 reached each partial cylindrical lens from a slightly different angle. Thus, if the partial cylindrical lens surface 68 of FIG. 10A is considered to be the centermost one on the plate 64, that is the lens surface which was transected by the optical axis of lens 130 during the above-described exposure, then a portion of the image data for that exposure is recorded at a narrow band B3 centered behind lens surface 68. However, if lens surface 68 of FIG. 10D is considered to be one which was at one side of the optical axis of lens 130 during the exposure, then image data for that exposure is not recorded at the band B3 which is centered behind the lens surface 68. Instead, the image data is recorded at some other band, such as B1, B2, B4 or B5 for example, the exact location of which depends on the amount and direction of the displacement of the particular lens surface 68 from the optical axis of lens 130 during that exposure.

A series of additional exposures are made with the objective lens 130 and plate 64 including film 120 being repositioned between each such exposure. In particular, objective lens 130 may be shifted sidewardly slightly to the position P4 in FIG. 10A, the lens 130 preferably being turned as necessary during this movement so that the optical axis remains directed at the same central point of cabin 125 as was previously the case. Plate 64 with film 120 is also shifted sidewardly in the same direction to position P4 while preferably being turned slightly to remain parallel to objective lens 130. The sideward movement of plate 64 to position P4 is sufficiently greater than that of objective lens 130 to cause the plate to be shifted relative to the optical axis of the objective lens. Consequently, when the second exposure is made from position P4, image data is recorded on film 120 behind each partial cylindrical lens surface 68 at a different area from that at which the image data for the first exposure was recorded. Thus, referring again to FIG. 10D, if image data for the first exposure was recorded at band B3 behind a particular lens surface 68 then the image data for the second exposure is recorded at a different band, B4 for example, during the second exposure.

Referring again to FIG. 10A, more exposures are made with the objective lens 130 and plate 64 being shifted to additional positions, such as P5, P2 and P1 for example, situated at both sides of the center position P3. Referring again to FIG. 10D, this enables image data for each exposure to be recorded at a different narrow band B1 to B5 behind each partial cylindrical lens surface 68 of the plate 64.

While a series of only five exposures has been depicted for purposes of example, in practice the ability of a lenticular plate to separate and laterally compress image data received from slightly different directions is such that as many as twenty exposures may typically be made without overlap of image data on the film.

The film 120 is then developed and a print is prepared and put back against the lenticular plate 64 in the exact position which was occupied by the film during the exposures. When an observer views the plate 64, one of his eyes perceives an image of the interior of the aircraft cabin taken from a first angle while the other eye perceives an image of the cabin taken from a slightly different angle owing to the optical action of the lenticular plate as hereinbefore described. Since the two different views of the cabin constitute a stereo pair as depicted in FIGS. 10B and 10C, a three-dimensional perception of the forward portion of an aircraft cabin occurs.

In order to permit perception of the 3D shadow images of the other components of the artificial scene as if viewed through the windshield and side window of the aircraft cabin image, the portions of the developed photographic print which correspond to the windshield and side window areas of FIGS. 10B and 10C may be cut away prior to emplacement of the print against the lenticular plate 64.

Thus, while the invention has been disclosed with respect to certain exemplary embodiments, it will be apparent that many other variations and modifications are possible and it is not intended to limit the invention except as defined by the following claims.

What is claimed is:

1. A light-analyzing lenticular screen for intercepting a mixture of light having a first characteristic and light having a second characteristic and for causing one eye of an observer to perceive only said light having said first characteristic and for causing the other eye of said observer to perceive only said light which has said second characteristic, comprising:
   a first plurality of linear parallel spaced-apart light-analyzing elements which are at least partially transparent to light having said first characteristic and which are opaque to light having said second characteristic, a second plurality of linear parallel spaced-apart light-analyzing elements alternated with said first plurality of elements in parallel relationship therewith, said second elements being at least partially transparent to light having said second characteristic and being opaque to light having said first characteristic, and a lenticular screen disposed parallel to said first and second light-analyzing elements and having lens means for restricting visibility of said first plurality of light-analyzing elements to said one eye and restricting visibility of said second plurality of light-analyzing elements to said other eye.

2. The combination defined in claim 1 wherein said first light-analyzing elements are formed of light-polarizing material having a first polarization plane orientation and said second light-analyzing elements are formed of polarizing filter material having a different polarization plane orientation.

3. The combination defined in claim 1 wherein said first light-analyzing elements are formed of a first color filter material and said second light-analyzing elements are formed of a different color filter material.

4. The combination defined in claim 1 wherein said lenticular screen has a first flat surface facing said first and second light-analyzing elements and has an opposite surface formed to constitute a plurality of linear partial cylindrical lenses extending in parallel relationship with said first and second light-analyzing elements and each subtending a separate adjacent pair of said light-analyzing elements wherein each of said adjacent pairs of elements includes one of said first elements and one of said second elements.

5. The combination defined in claim 4 wherein said first surface of said lenticular screen is a light diffusing surface.

6. The combination defined in claim 1 wherein said lens means includes a plurality of parallel partial cylindrical lenses each positioned for enabling viewing of an associated separate pair of said light analyzing elements wherein each such pair includes one of said first light analyzing elements and one of said second light analyzing elements, and wherein a central pair of said light analyzing elements are symmetrically positioned with respect to the focal plane of the associated one of said partial cylindrical lenses, and wherein the boundaries between adjacent edges of others of said pairs of light analyzing elements are offset relative to the focal planes of the associated ones of said partial cylindrical lenses, said boundaries being offset in a first direction at one side of said central pair and being offset in the opposite direction at the other side of said central pair.

7. A light analyzing lenticular screen for transmitting light having a first characteristic to a first region and for transmitting light having a second characteristic to a second spaced apart region, comprising in combination: analyzing means for establishing a first plurality of spaced apart light transmitting areas which suppress light having said first characteristic while transmitting light having said second characteristic and for establishing a second plurality of spaced apart light transmitting areas which suppress light having said second characteristic while transmitting light having said first characteristic and which are situated between said first areas, and lenticular screen means for directing light transmitted through said first areas to said second region and away from said first region and for directing light transmitted through said second areas to said first region and away from said second region.

* * * * *